(12) United States Patent
Weitzel et al.

(10) Patent No.: US 6,734,246 B2
(45) Date of Patent: May 11, 2004

(54) POLYVINYLACETAL-GRAFTED POLYMERS

(75) Inventors: Hans-Peter Weitzel, Reischach (DE); Peter Ball, Emmerting (DE); Peter Tschirner, Emmerting (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 195 days.

(21) Appl. No.: 10/040,675

(22) Filed: Nov. 9, 2001

(65) Prior Publication Data

US 2002/0115785 A1 Aug. 22, 2002

(30) Foreign Application Priority Data

Dec. 14, 2000 (DE) .......................................... 100 62 176

(51) Int. Cl.$^7$ ................................ C08F 2/24; C08F 2/16
(52) U.S. Cl. ..................... 524/459; 524/803; 524/832; 526/291; 526/315; 526/319
(58) Field of Search ................................ 524/459, 803, 524/832; 526/291, 315, 319

(56) References Cited

U.S. PATENT DOCUMENTS

| 3,446,768 A | 5/1969 | Werner |
| 4,350,788 A | 9/1982 | Shimokawa et al. |
| 5,635,566 A | 6/1997 | Gerharz et al. |

FOREIGN PATENT DOCUMENTS

| DE | 936 063 | 12/1955 |
| DE | 1 202 982 | 10/1965 |
| DE | 12 02 982 | 10/1965 |
| DE | 33 16 948 A1 | 11/1984 |
| DE | 222 880 | 5/1985 |
| DE | 222 880 A1 | 5/1985 |
| DE | 199 01 307 | 6/2000 |
| DE | 199 28 933 A1 | 12/2000 |
| EP | 0 149 098 A2 | 7/1985 |
| EP | 0 477 900 A2 | 4/1992 |
| EP | 0 655 464 A2 | 5/1995 |
| EP | 1 020 493 A1 | 7/2000 |
| WO | WO 99/16794 | 4/1999 |

OTHER PUBLICATIONS

Derwent Abstract corresponding to DE 199 01 307 [AN 2000–401211].
Caplus Abstract corresponding to DE 1202982.
Derwent Abstract corresponding to DD 222880 [AN 1985–230697].
Fox T.G., Bull. Am. Physics Soc. 1, 3, p. 123 [1956].
Polymer Handbook, 2$^{nd}$ Edition, J. Wiley & Sons, New York (1975).
Derwent Abstract Corresponding To EP 0477900 [AN 1992–106296].
Derwent Abstract Corresponding To DE 3316948 [AN 1984–289272].
Derwent Abstract Corresponding To EP 0149098 [AN 1985–153463].
Derwent Abstract Corresponding To EP 0655464 [AN 1995–195558].
Derwent Abstract Corresponding To EP 1020493 [AN 2000–401211].
Abstract Corresponding To DE 1202982 [Caulus].
Derwent Abstract Corresponding To WO 99/16794 [AN 1999–255060].
Derwent Abstract Corresponding To DE 19928933 [AN 2001–148205].
Abstract Corresponding To DE 936063 [Caplus].

*Primary Examiner*—Kriellion A. Sanders
(74) *Attorney, Agent, or Firm*—Brooks Kushman P.C.

(57) ABSTRACT

Polyvinylacetal-grafted polymers in the form of their aqueous dispersions or water-redispersible powders, and based on emulsion or suspension polymerized base polymers of one or more monomers from the group consisting of vinyl esters, (meth)acrylates, vinylaromatics, olefins, 1,3-dienes and vinyl halides, and optionally, further monomers copolymerizable therewith, the base polymers grafted with polyvinylacetals having from 0 to 5.0 mol % of vinyl acetate units, from 75 to 95 mol % of vinyl alcohol units and from 0.1 to 20 mol % of acetal units which are derived from aldehydes having 3 to 7 C atoms, are useful as additives in construction compositions, as binders, and as adhesives, and may be dried to form readily water-redispersible polymer powders.

15 Claims, No Drawings ism
POLYVINYLACETAL-GRAFTED POLYMERS

BACKGROUND OF THE INVENTION

1. Field of the Invention

The invention relates to polyvinylacetal-grafted polymers in the form of their aqueous dispersions or water-redispersible powders, to processes for their preparation and to their use.

2. Description of the Related Art

Polymers stabilized with protective colloids are used in a wide range of applications, in particular, in the form of their aqueous dispersions or water-redispersible polymer powders. Examples include their use as coating materials or as adhesives for a variety of substrates, for instance as cement-containing tile adhesives. The protective colloids used as stabilizers are, as a rule, polyvinyl alcohols. The use of polyvinyl alcohol is desirable, since in contrast to systems stabilized by low molecular weight compounds (emulsifiers), the polyvinyl alcohol also contributes to the overall strength, for example, to adhesive strength values in tile cements. However, difficulties may arise during the preparation and use of polymers stabilized with protective colloids. In particular, when polymers in the form of their redispersion powders are employed to improve mortar properties, a main field of use of redispersion powders, the formulations must remain stable over a certain time and may not substantially change their processing consistency as reflected by, for example, viscosity stability or cement stability. Polyvinyl alcohol-stabilized polymer powders are mentioned, for example, in EP-A 149098, in EP-A 477900 and in WO-A 99/16794. Although such polyvinyl alcohol-stabilized polymer powders exhibit good viscosity and processing behavior in applications which involve use of cement, it is desirable in many cases to further improve this behavior.

Polyvinylacetals having sulfonate functional groups are known as protective colloids useful in the preparation of aqueous polymer dispersions. DE-A 3316948 describes polyvinylacetals which have sulfonate functional groups in which up to 10 mol % of OH groups have been acetalated with an aldehyde bearing sulfonate functional groups. EP-A 655464 relates to a process for the preparation of polymer dispersions employing polyvinylacetals having a high degree of acetalation and up to 20 mol % of sulfonate groups as protective colloids.

EP-A 1020493 describes a process for the preparation of dispersion powders stabilized with protective colloids, the parent polymer dispersions having been stabilized with polyvinyl alcohol as a protective colloid, and partially acetalated polyvinyl alcohols then used as a protective colloid for spray drying the dispersions. The use of the partially acetalated polyvinyl alcohols as protective colloids during polymerization is ruled out, since the latter are said to decompose at low pH and to be precipitated from aqueous solution at high temperatures. The use of partially acetalated polyvinyl alcohols as protective colloids for the preparation of frost-stable, aqueous dispersions is disclosed in DE-B 1202982, where partially hydrolyzed polyvinyl alcohols or polyvinylacetals having a high vinyl acetal content are used. DD-A 222880 describes the preparation of polyvinyl acetates having improved water resistance by polymerizing vinyl acetate in the presence of polyvinyl alcohol acetalated with acetaldehyde.

SUMMARY OF THE INVENTION

It is an object of the invention to provide polymers which, when employed in cement-based applications, have improved viscosity stability and cement stability and do not retard setting of the cement, as compared with polyvinyl alcohol-stabilized polymers. These and other objectives are attained by means of polyvinylacetal-grafted polymers or redispersible powders obtained therefrom, wherein the aldehydes employed in acetalation of the polyvinylacetal polymers comprise 3 to 7 C atom-containing aldehydes.

DETAILED DESCRIPTION OF THE PREFERRED EMBODIMENTS

The invention relates to polyvinylacetal-grafted polymers in the form of their aqueous dispersions or water-redispersible powders prepared by emulsion or suspension polymerization of one or more monomers from the group of vinyl esters, (meth)acrylates, vinylaromatics, olefins, 1,3-dienes, and vinyl halides, and, if desired, further monomers copolymerizable therewith, the resulting polymers being grafted with polyvinylacetals having from 0 to 5.0 mol % of vinyl acetate units, from 75 to 95 mol % of vinyl alcohol units and from 0.1 to 20 mol % of acetal units derived from aldehydes having 3 to 7 C atoms.

The invention furthermore relates to a process for the preparation of polyvinylacetal-grafted polymers in the form of their aqueous dispersions or water-redispersible powders by means of free radical emulsion or suspension polymerization, in an aqueous medium, of one or more monomers from the group of vinyl esters, (meth)acrylates, vinylaromatics, olefins, 1,3-dienes and vinyl halides and, if required, further monomers copolymerizable therewith, in the presence of one or more protective colloids a) and, if required, drying of the polymer dispersions obtained thereby in the presence of one or more protective colloids b), the polymerization being carried out at a pH of from 5 to 8, wherein protective colloids a) comprise partially acetalated polyvinyl alcohols having from 0 to 5.0 mol % of vinyl acetate units, from 75 to 99 mol % of vinyl alcohol units and from 0.1 to 20 mol % of acetal units derived from aldehyde (s) having 3 to 7 C atoms, the parent polyvinyl alcohol having a viscosity of from 2 to 30 mPa·s, and wherein protective colloids b) comprise one or more protective colloids differing from a) for drying, preferably spray drying.

Suitable vinyl esters are those of carboxylic acids having 1 to 12 C atoms. Vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 C atoms, for example VeoVa9$^R$ or VeoVa10$^R$ (trade names of Shell), are preferred. Vinyl acetate is particularly preferred.

Suitable monomers from the group consisting of acrylates or methacrylates are esters of straight-chain or branched alcohols having 1 to 15 C atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate. Methyl acrylate, methyl methacrylate, n-butyl acrylate, tert-butyl acrylate and 2-ethylhexyl acrylate are particularly preferred.

Preferred vinylaromatics are styrene, methylstyrene and vinyltoluene. A preferred vinyl halide is vinyl chloride. The preferred olefins are ethylene and propylene, and the preferred dienes are 1,3-butadiene and isoprene.

Optionally, from 0.1 to 5% by weight, based on the total weight of the monomer mixture, of auxiliary monomers may also be copolymerized. From 0.5 to 2.5% by weight of auxiliary monomers are preferably used. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid such as their diethyl and diisopropyl esters, maleic anhydride, and ethylenically unsaturated sulfonic acids and salts thereof, preferably vinylsulfonic acid and 2-acrylamido-2-methylpropanesulfonic acid. Further examples of auxiliary monomers are precrosslinking comonomers such as polyethylenically unsaturated comonomers, for example divinyl adipate, diallyl maleate, allyl methacrylate, and triallyl cyanurate, or postcrosslinking comonomers, for example acrylamidoglycolic acid (AGA), methylacrylamidoglycolic acid methyl ester (MAGME), N-methylolacrylamide (NMA), N-methylolmethacrylamide and N-methylolallylcarbamate, alkyl ethers such as isobutoxy ether, and esters of N-methylolacrylamide, of N-methylolmethacrylamide and of N-methylolallylcarbamate. Comonomers having epoxide functional groups, such as glycidyl methacrylate and glycidyl acrylate, are also suitable. Further examples are comonomers having silicon functional groups, such as acryloyloxypropyltri(alkoxy)- and methacryloyloxypropyltri(alkoxy)silanes, vinyltrialkoxysilanes and vinylmethyldialkoxysilanes, it being possible, for example, for ethoxy and ethoxypropylene glycol ether radicals to be present as alkoxy groups. Monomers having hydroxyl or CO groups may also be mentioned, for example hydroxyalkyl methacrylates and acrylates such as hydroxyethyl, hydroxypropyl or hydroxybutyl acrylates or methacrylates, and compounds such as diacetoneacrylamide and acetylacetoxyethyl acrylate or methacrylate.

Monomers or mixtures which contain one or more monomers from the group consisting of vinyl acetate, vinyl esters of a-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate and styrene are particularly preferred. Most preferred are mixtures of vinyl acetate with ethylene; of vinyl acetate, ethylene, and vinyl ester(s) of a-branched monocarboxylic acids having 9 to 11 C atoms; of n-butyl acrylate with 2-ethylhexyl acrylate and/or methyl methacrylate; of styrene with one or more monomers from the group of methyl acrylate, ethyl acrylate, propyl acrylate, n-butyl acrylate and 2-ethylhexyl acrylate; of vinyl acetate with one or more monomers from the group of methyl acrylate, ethyl acrylate, propyl acrylate, n-butyl acrylate, 2-ethylhexyl acrylate and, if required, ethylene; it being possible, if required, for said mixture also to contain one or more of the abovementioned auxiliary monomers.

The choice of the monomers and selection of the amounts by weight of the various comonomers is made in such a way that in general a glass transition temperature ("Tg") of from −50° C. to +50° C., preferably from −30° C. to +40° C., results. The Tg of the polymers can be determined in a known manner by means of differential scanning calorimetry (DSC). The Tg can also be calculated approximately in advance by means of the Fox equation. According to T. G. Fox, BULL. AM. PHYSICS SOC. 1, 3, page 123 (1956), the following is true: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers appear in the POLYMER HANDBOOK 2nd Edition, J. Wiley & Sons, New York (1975).

Suitable polyvinylacetals are partially acetalated polyvinyl alcohols having from 0 to 5 mol % of vinyl acetate units, from 75 to 99 mol %, preferably from 80 to 98 mol %, of vinyl alcohol units and from 0.1 to 20 mol %, preferably from 10 to 20 mol %, and more preferably from 11 to 15 mol % of acetal units derived from aldehydes having 3 to 7 C atoms, preferably 4, 6 or 7 C atoms. Examples of suitable aldehydes are propionaldehyde, butyraldehyde, pentanal and hexanal and mixtures of these aldehydes with one another or mixtures of these aldehydes with acetaldehyde. The viscosity of the polyvinyl alcohol on which the polyvinylacetal is based (prior to acetalation) is from 1 to 30 mPa·s (DIN 53015, 4% strength aqueous solution, Höppler method at 20° C.).

The polyvinylacetals can be produced by known processes for the preparation of polyvinylacetals. The acetalation of a partially or completely hydrolyzed polyvinyl alcohol in the aqueous phase under acid catalysis (hydrochloric acid, sulfuric acid) at elevated temperature (from 30° C. to 80° C.) is preferred. The polyvinylacetal is preferably not isolated but is used directly as an aqueous solution for the polymerization. Highly hydrolyzed and completely hydrolyzed polyvinyl alcohols having a degree of hydrolysis of more than 75 mol %, preferably more than 90 mol % and a viscosity of from 1 to 30 mPa·s (DIN 53015, 2% strength aqueous solution, Höppler method) have proven suitable as starting polyvinyl alcohols.

The graft polymers are prepared by the emulsion polymerization process or by the suspension polymerization process, preferably by the emulsion polymerization process, the polymerization temperature generally being from 40° C. to 100° C., preferably from 60° C. to 80° C. In the copolymerization of gaseous comonomers such as ethylene, 1,3-butadiene or vinyl chloride, superatmospheric pressure, in general from 5 bar to 100 bar, can also be employed. The polymerization is carried out at a pH of from 5 to 8.

The polymerization is initiated with the water-soluble or monomer-soluble initiators or redox initiator combinations customary for emulsion or suspension polymerization. Examples of water-soluble initiators are the sodium, potassium and ammonium salts of peroxydisulfuric acid, hydrogen peroxide, tert-butyl peroxide, tert-butyl hydroperoxide, potassium peroxydiphosphate, tert-butyl peroxypivalate, cumyl hydroperoxide, isopropylbenzene monohydroperoxide and azobisisobutyronitrile. Examples of monomer-soluble initiators are diacetyl peroxydicarbonate, dicyclohexyl peroxydicarbonate, and benzoyl peroxide. The initiators are used, in general, in an amount of from 0.01 to 0.5% by weight, based on the total weight of the monomers.

The redox initiators used are combinations of the foregoing initiators together with reducing agents. Suitable reducing agents are the sulfites and bisulfites of the alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is preferably from 0.01 to 0.5% by weight, based on the total weight of the monomers.

Regulating substances can be used for controlling the molecular weight during polymerization. If regulators (chain transfer agents) are used, they are usually employed in amounts of from 0.01 to 5.0% by weight, based on the monomers to be polymerized, and are metered separately or after premixing with reaction components. Examples of such substances are n-dodecyl mercaptan, tert-dodecyl mercaptan, mercaptopropionic acid, methyl mercaptopropionate, isopropanol and acetaldehyde. Preferably, no regulating substances are used.

The polyvinylacetal to be grafted on is used as a protective colloid a) in the polymerization. The amount of polyvinylacetal protective colloid in the polymerization is from 3 to 20% by weight, preferably from 5 to 15% by weight, based in each case on the total amount of monomers. The amount of protective colloid can be either completely introduced initially or partly introduced initially and partly metered in during the polymerization. Preferably, at least 5% by weight of the total amount of protective colloid is initially present, and more preferably, the total amount of the protective colloid is initially present. Optionally, further protective colloids b), for example partially hydrolyzed or completely hydrolyzed polyvinyl alcohols, such as partially hydrolyzed polvinyl alcohols having a degree of hydrolysis of from 80 to 95 mol % and a Höppler viscosity, in 4% strength aqueous solution, of from 1 to 30 mPa·s (Höppler method at 20° C., DIN 53015) can be used in addition to the polyvinylacetal protective colloid a) during the polymerization. Polymerization preferably takes place without the addition of further protective colloids b).

In the process according to the invention, polymerization is preferably effected without the addition of emulsifiers. In exceptional cases, it may be advantageous additionally to use small amounts of emulsifiers, if required from 1 to 5% by weight, based on the amount of monomers. Suitable emulsifiers are anionic, cationic and nonionic emulsifiers, for example anionic surfactants such as alkylsulfates having a chain length of from 8 to 18 C atoms, alkyl- or alkylarylethersulfates having 8 to 18 C atoms in the hydrophobic radical and up to 40 ethylene oxide or propylene oxide units, alkyl- or alkylarylsulfonates having 8 to 18 C atoms, esters and monoesters of sulfosuccinic acid with monohydric alcohols or alkylphenols, and nonionic surfactants such as alkyl polyglycol ethers or alkylaryl polylgycol ethers having from 8 to 40 oxyethylene units.

The monomers can be wholly introduced initially, entirely metered in, or introduced initially in fractions with the remainder metered in after initiation of the polymerization. In a preferred procedure, about 50 to 100% by weight, based on the total weight of the monomers, are introduced initially, and the remainder is metered in. The metering procedures can be carried out separately (spatially and in terms of time) or some or all of the components to be metered can be mixed together or emulsified before being metered.

Depending on their chemical nature, auxiliary monomers can likewise be initially introduced in their entirety, or metered in during polymerization. Initially introducing a portion of the auxiliary monomers and metering additional auxiliary monomer(s) is also possible. In the case of vinyl acetate polymerizations, the auxiliary monomers may be metered or initially introduced, depending on their copolymerization parameters. For example, acrylic acid derivatives are generally metered, while vinylsulfonate is desirably introduced initially. The monomer conversion is controlled by means of the initiator dosage. It is most preferred that the initiator(s) are metered in rather than being present initially.

After the end of the polymerization, postpolymerization can be effected for removal of residual monomers using known methods, for example by postpolymerization initiated with a redox catalyst. Volatile residual monomers can also be removed by means of distillation, preferably under reduced pressure, and, if required, while passing inert entraining gases such as air, nitrogen or steam through or over the polymer dispersion.

The aqueous dispersions obtainable by the process according to the invention have a solids content of from 30 to 75% by weight, preferably from 50 to 60% by weight. For the preparation of water-redispersible polymer powders, protective colloid b) is added to the aqueous dispersions, which are then dried, for example by means of fluidized-bed drying, freeze-drying or spray-drying. Preferably, the dispersions are spray-dried. The spray-drying is effected in conventional spray-drying units, it being possible to effect the atomization by means of airless high-pressure nozzles, binary nozzles or multimedia nozzles, or by using a rotating disk. The outlet temperature is generally chosen in the range of 45° C. to 120° C., preferably from 60° C. to 90° C., depending on the drying unit, the Tg of the resin, and the desired degree of drying.

Suitable protective colloids b) include partially hydrolyzed polyvinyl alcohols; polyvinylpyrrolidones; polysaccharides in water-soluble form such as starches (amylose and amylopectin), celluloses and their carboxymethyl, methyl, hydroxyethyl and hydroxypropyl derivatives; proteins such as casein, caseinate(s), soybean protein, and gelatin; ligninsulfonates; synthetic polymers such as poly (meth)acrylic acid, copolymers of (meth)acrylates with comonomer units having carboxyl functional groups, poly (meth)acrylamide, and polyvinylsulfonic acids and their water-soluble copolymers; melamine formaldehyde sulfonates, naphthalene formaldehyde sulfonates, and styrene/maleic acid and vinyl ether/maleic acid copolymers.

As a rule, the protective colloid b) for spraying is used in a total amount of from 3 to 30% by weight, based on the polymeric components of the aqueous polymer dispersion; preferably, from 5 to 20% by weight, based on the amount of polymer. Preferably, partially hydrolyzed polyvinyl alcohols having a degree of hydrolysis of from 80 to 95 mol % and a Höppler viscosity, in 4% strength aqueous solution, of from 1 to 30 mPa·s (Höppler method at 20° C., DIN 53015) are used. In a further preferred embodiment, no protective colloids other than polyvinyl alcohols are used as spraying aids.

During the spraying, an antifoam content of up to 1.5% by weight, based on the base polymer, has often proven advantageous. In order to increase the shelf-life by improving the stability to caking, and in particular in the case of powders having a low glass transition temperature, the powder obtained can be treated with an anticaking agent, preferably in an amount of up to 30% by weight based on the total weight of the polymeric components. Examples of anticaking agents are calcium carbonate, magnesium carbonate, talc, gypsum, silica, kaolins and silicates, these agents preferably having particle sizes in the range from 10 nm to 10 μm.

The viscosity of the aqueous polymer dispersion feed to be sprayed is adjusted by means of the solids content so that a value of preferably less than 500 mPa·s (Brookfield viscosity at 20 revolutions and 23° C.), more preferably less than 250 mPa·s, is obtained. The solids content of the dispersion to be sprayed is generally greater than 35%, preferably greater than 40%.

In order to improve the performance characteristics, further additives may be introduced during the spraying. Further components of dispersion powder compositions, which are present in preferred embodiments, are, for example, pigments, fillers, foam stabilizers and/or water repellents.

The polyvinylacetal-grafted polymers can be used in the form of their aqueous dispersions or water-redispersible powders in typical applications, for example in chemical products for the construction industry, optionally in combination with hydraulically setting binders such as cements (Portland, high-alumina, trass, slag, magnesia and phosphate cement(s)), gypsum and waterglass, and in particular, for the production of construction adhesives such as tile adhesives and heat insulation adhesives, and of renders, filling compounds, floor filling compounds, leveling compositions, sealing slurries, joint mortars and paints, and furthermore as binders for coating materials and adhesives, and as coating materials or binders for textiles, fiber materials and paper.

The following examples serve to illustrate the invention further.

Polyvinylacetal 1

A polyvinylbutyral having a degree of acetalation of 11 mol % and 89 mol % of vinyl alcohol units was prepared from a polyvinyl alcohol having a degree of hydrolysis of 98 mol % and a Höppler viscosity, in 4% strength aqueous solution, of 2 mPa·s (Höppler method at 20° C., DIN 53015) and butyraldehyde.

Polyvinylacetal 2

A polyvinylbutyral having a degree of acetalation of 11 mol % and 89 mol % of vinyl alcohol units was prepared from a polyvinyl alcohol having a degree of hydrolysis of 98 mol % and a Höppler viscosity of 3 mPa·s and butyraldehyde.

Polyvinylacetal 3

A polyvinylbutyral having a degree of acetalation of 11 mol % and 89 mol % of vinyl alcohol units was prepared from a polyvinyl alcohol having a degree of hydrolysis of 98 mol % and a Höppler viscosity of 4 mPa·s and butyraldehyde.

Polyvinylacetal 4

A polyvinylhexanal having a degree of acetalation of 11 mol % and 89 mol % of vinyl alcohol units was prepared from a polyvinyl alcohol having a degree of hydrolysis of 98 mol % and a Höppler viscosity of 2 mPa·s and hexanal.

Polvinylacetal 5

A polyvinylacetal having a degree of acetalation of 15 mol % and 85 mol % of vinyl alcohol units was prepared from a polyvinyl alcohol having a degree of hydrolysis of 98 mol % and a Höppler viscosity of 2 mPa·s and acetaldehyde.

EXAMPLE 1

Emulsion Polymerization with Polyvinylacetal 1

180 g of water, 381 g of polyvinylacetal 1 (14% strength aqueous solution), 107 g of VeoVa10 and 427 g of vinyl acetate were initially introduced into a polymerization vessel. This preemulsion was adjusted to a pH of 7.0 and heated to 50° C. In order to initiate the polymerization, tert-butyl hydroperoxide (0.2% strength aqueous solution) and sodium formaldehyde sulfoxylate (0.3% strength aqueous solution) were metered in, each at 3 g/h. The temperature was kept at 65° C. by cooling. 30 min after the beginning of the reaction, the metering of 107 g of VeoVa10, 427 g of vinyl acetate, 381 g of polyvinylacetal 1 and 57 g of water was started. These amounts were metered in over a period of 3 h. Thereafter, postpolymerization was carried out for a further hour and cooling was effected. The prepared dispersion was adjusted to pH of about 7. The dispersion had a solids content of 48.6% and a viscosity of 83 mPa·s. After the addition of 5% by weight (solid/solid) of a polyvinyl alcohol having a degree of hydrolysis of 88 mol % and a Höppler viscosity of 4 mPa·s, the dispersion was sprayed conventionally to produce a powder. The powder obtained was free-flowing, readily redispersible and stable to caking.

EXAMPLE 2

Emulsion Polymerization with Polyvinylacetal 1

Vinyl acetate and VeoVa10 were polymerized in the presence of ethylene in a pressure autoclave analogously to example 1. The ethylene content of the copolymer was about 8% by weight. The dispersion had a solids content of 54.7% and a viscosity of 305 mPa·s. The dispersion was sprayed analogously to example 1, and a free-flowing, redispersible powder stable to caking was obtained.

EXAMPLE 3

Emulsion Polymerization with Polyvinylacetal 2

A dispersion was prepared with polyvinylacetal 2 analogously to example 1. The dispersion had a solids content of 54.0% and a viscosity of 890 mPa·s. The dispersion was sprayed analogously to example 1, and a free-flowing redispersible powder stable to caking was obtained.

EXAMPLE 4

Emulsion Polymerization with Polyvinylacetal 3

A dispersion was prepared with polyvinylacetal 3 analogously to example 1. The dispersion had a solids content of 50.5% and a viscosity of 955 mPa·s. The dispersion was sprayed analogously to example 1, and a free-flowing redispersible powder stable to caking was obtained.

EXAMPLE 5

Emulsion Polymerization with Polyvinylacetal 4

A dispersion was prepared with polyvinylacetal 4 analogously to example 1. The dispersion had a solids content of 43.5% and a viscosity of 2400 mPa·s. The dispersion was sprayed analogously to example 1, and a free-flowing redispersible powder stable to caking was obtained.

COMPARATIVE EXAMPLE 6

Emulsion Polymerization with Polyvinylacetal 5

Polymerization was effected using polyvinylacetal 5 as a protective colloid analogously to example 1. The dispersion coagulated.

COMPARATIVE EXAMPLE 7

Emulsion Polymerization with Polyvinylacetal 1

A dispersion was prepared with polyvinylacetal 1 analogously to example 1. The pH was not adjusted before the polymerization and was 4.2. The dispersion coagulated.

COMPARATIVE EXAMPLE 8

Emulsion Polymerization with Polyvinyl Alcohol

Vinyl acetate and ethylene were polymerized in a weight ratio of 93:7 analogously to the procedure in example 2. Instead of a polyvinylacetal protective colloid, 8% by weight, based on vinyl acetate, of a polyvinyl alcohol having a degree of hydrolysis of 88 mol % and a Höppler viscosity of 4 mPa·s were used for stabilization. The dispersion was sprayed analogously to example 1, and a free-flowing, redispersible powder stable to caking was obtained.

COMPARATIVE EXAMPLE 9

Emulsion Polymerization with Polyvinyl Alcohol

Vinyl acetate and VeoVa10 were polymerized in a weight ratio of 80:20, in the presence of a polyvinyl alcohol having a degree of hydrolysis of 88 mol % and a Höppler viscosity of 4 mPa·s, analogously to the procedure in example 1. The dispersion was sprayed analogously to example 1, and a free-flowing, redispersible powder stable to caking was obtained.

COMPARATIVE EXAMPLE 10
Emulsion Polymerization with Polyvinyl Alcohol, Spray-drying with Polyvinylbutyral Vinyl acetate and VeoVa10 were polymerized in a weight ratio of 80:20, but in the presence of a polyvinyl alcohol having a degree of hydrolysis of 88 mol % and a Höppler viscosity of 4 mPa·s, analogously to the procedure in example 1. The dispersion was sprayed analogously to example 1, the polyvinylacetal 1 being used as a protective colloid for spraying. A free-flowing, redispersible powder stable to caking was obtained.

Determination of the Cement Stability

A cement mix having the following formulation was prepared by mixing:

| Portland cement | | 82.5 g |
|---|---|---|
| Calcite (CaCO$_3$) | 10–40 µm | 75 g |
| Quartz sand | 200–500 µm | 142 g |
| Dispersion (powder) | | 29 (15) g |
| Water | | 100 g |

The viscosities of this mix directly after preparation, "$V_0$", and after 60 min, "$V_{60}$", were determined. The quotient $V_{60}/V_0$ is a measure of the increase in viscosity and of the cement stability. The value is multiplied by 100 and reported as a % value.

The test results are summarized in table 1.

The procedure according to the invention always leads to cement-stable polymer dispersion. The cement stability is better than in the case of comparable polyvinyl alcohol-stabilized powders (comparative examples 8–10) as used traditionally.

TABLE 1

| Example | Cement Stability % |
|---|---|
| Example 1 | 142 |
| Example 2 | 130 |
| Example 3 | 143 |
| Example 4 | 137 |
| Example 5 | 132 |
| Comp. Example 6 | coagulated |
| Comp. Example 7 | coagulated |
| Comp. Example 8 | 163 |
| Comp. Example 9 | 157 |
| Comp. Example 10 | 165 |

By the terms "a" and "an" are meant "one or more" unless specified otherwise. Unless specified otherwise, the singular of a class of monomers or other composition components includes a plurality of monomers or compounds from the respective class, and the plural includes the singular. By use of "(s)" as an optional plural is meant "one or more," and the absence of "(s)" does not imply only one or only a plurality as the case may be. The specification and claims are to be interpreted so as to provide to the applicants the benefit of their invention. By terms such as "vinyl alcohol units", "acetal units" and the like is meant the respective moieties of the polymer which may be considered derived from the monomers supplying such units.

While the best mode for carrying out the invention has been described in detail, those familiar with the art to which this invention relates will recognize various alternative designs and embodiments for practicing the invention as defined by the following claims.

What is claimed is:

1. A polyvinylacetal-grafted polymer in the form of its aqueous dispersion or water-redispersible powder, said polyvinylacetal-grafted polymer comprising at least one base polymer prepared by emulsion or suspension polymerization of at least one of vinyl ester monomer(s), (meth) acrylate monomer(s), vinylaromatic monomer(s), olefin monomer(s), 1,3-diene monomer(s), and vinyl halide monomer(s), and optionally, further monomers copolymerizable therewith, said base polymer grafted with at least one polyvinylacetal polymer comprising from 0 to 5.0 mol % of vinyl acetate units, from 75 to 95 mol % of vinyl alcohol units and from 0.1 to 20 mol % of acetal units derived from aldehydes having 3 to 7 C atoms.

2. The polyvinylacetal-grafted polymer of claim 1, wherein monomers polymerized to form said base polymer include one or more of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene.

3. The polyvinylacetal-grafted polymer of claim 1, wherein said polyvinylacetal is a partially acetalated polyvinyl alcohol comprising from 80 to 90 mol % of vinyl alcohol units and from 10 to 20 mol % of acetal units derived from aldehydes having 3 to 7 C atoms, or of mixtures of aldehydes having 3 to 7 C atoms with acetaldehyde, said mixtures containing minimally 0.1 mol % of aldehydes having 3 to 7 C atoms based on the polyvinylacetal.

4. The polyvinylacetal-grafted polymer of claim 3, wherein said polyvinylacetal contains from 11 to 15 mol %, based on the polyvinylacetal, of acetal units dervied from 3 to 7 C atom-containing aldehydes.

5. A process for the preparation of polyvinylacetal-grafted polymers in the form of their aqueous dispersions or water-redispersible powders, comprising polymerizing by means of free radical emulsion or suspension polymerization, in an aqueous medium, of one or more vinyl ester monomer(s), (meth)acrylate monomer(s), vinylaromatic monomer(s), olefin monomer(s), 1,3-diene monomer(s), or vinyl halide monomer(s), and optionally, further monomers copolymerizable therewith, said polymerizing taking place in the presence of one or more protective colloids a) and optionally, drying the polymer dispersion obtained thereby in the presence of one or more protective colloids b), wherein said polymerizing is carried out at a pH of from 5 to 8, and protective colloid(s) a) comprise partially acetalated polyvinyl alcohols having from 0 to 5.0 mol % of vinyl acetate units, from 75 to 99 mol % of vinyl alcohol units and from 0.1 to 20 mol % of acetal units derived from acetaldehyde having 3 to 7 C atoms, said partially acetalated polyvinyl alcohols obtained by acetalating a parent polyvinyl alcohol; wherein said parent polyvinyl alcohol has a viscosity of from 2 to 30 mPa·s, and wherein protective colloid(s) differing from a) are employed as protective colloids b).

6. The process of claim 5, wherein the protective colloid (s) b) include at least one of partially hydrolyzed polyvinyl alcohols; polyvinylpyrrolidones; polysaccharides; cellulose (s) and their carboxymethyl, methyl, hydroxyethyl and hydroxypropyl derivatives; proteins; soybean protein; gelatin; ligninsulfonates; poly(meth)acrylic acid; copolymers of (meth)acrylates with copolymerizable comonomer units bearing carboxyl functional groups; poly(meth)acrylamide; polyvinylsulfonic acids and their water-soluble copolymers; melamine formaldehyde sulfonates; naphthalene formaldehyde sulfonates; and styrene/maleic acid and vinyl ether/maleic acid copolymers.

7. The process of claim 5, wherein the amount of protective colloid a) is introduced initially in its entirety, or is partly introduced initially and partly metered in during said polymerizing.

8. The process of claim 6, wherein the protective colloid b) comprises a partially hydrolyzed polyvinyl alcohol having a degree of hydrolysis of from 80 to 95 mol % and a Höppler viscosity, in 4% strength aqueous solution, of from 1 to 30 mPa·s.

9. In construction adhesives, renders, filling compounds, floor filling compounds, leveling compounds, sealing slurries, joint mortars and paints, optionally comprising a hydraulically setting binder, wherein an aqueous polymer dispersion or water-redispersible polymer powder is employed, the improvement comprising selecting as at least one aqueous polymer dispersion or water-redispersible polymer powder an aqueous polymer dispersion or water-redispersible polymer powder of claim 1.

10. In construction adhesives, renders, filling compounds, floor filling compounds, leveling compounds, sealing slurries, joint mortars and paints, optionally comprising a hydraulically setting binder, wherein an aqueous polymer dispersion or water-redispersible polymer powder is employed, the improvement comprising selecting as at least one aqueous polymer dispersion or water-redispersible polymer powder an aqueous polymer dispersion or water-redispersible polymer powder of claim 2.

11. In construction adhesives, renders, filling compounds, floor filling compounds, leveling compounds, sealing slurries, joint mortars and paints, optionally comprising a hydraulically setting binder, wherein an aqueous polymer dispersion or water-redispersible polymer powder is employed, the improvement comprising selecting as at least one aqueous polymer dispersion or water-redispersible polymer powder an aqueous polymer dispersion or water-redispersible polymer powder of claim 3.

12. In construction adhesives, renders, filling compounds, floor filling compounds, leveling compounds, sealing slurries, joint mortars and paints, optionally comprising a hydraulically setting binder, wherein an aqueous polymer dispersion or water-redispersible polymer powder is employed, the improvement comprising selecting as at least one aqueous polymer dispersion or water-redispersible polymer powder an aqueous polymer dispersion or water-redispersible polymer powder of claim 4.

13. In a coating material, paint or adhesive wherein an aqueous polymer dispersion or water-redispersible polymer powder is employed, the improvement comprising selecting as at least one aqueous polymer dispersion or water-redispersible polymer powder, an aqueous polymer dispersion or water-redispersible polymer powder of claim 1.

14. In a coating material or binder for textiles or paper, wherein an aqueous polymer dispersion or water-redispersible polymer powder is employed, the improvement comprising selecting as at least one aqueous polymer dispersion or water-redispersible polymer powder, an aqueous polymer dispersion or water-redispersible polymer powder of claim 1.

15. In a tile cement or heat-insulating adhesive, wherein an aqueous polymer dispersion or water-redispersible polymer powder is employed, the improvement comprising selecting as at least one aqueous polymer dispersion or water-redispersible polymer powder, an aqueous polymer dispersion or water-redispersible polymer powder of claim 1.

* * * * *